Nov. 28, 1961  B. I. HIRSCHOWITZ  3,010,357
FLEXIBLE LIGHT TRANSMITTING TUBE
Filed Dec. 28, 1956  2 Sheets-Sheet 1
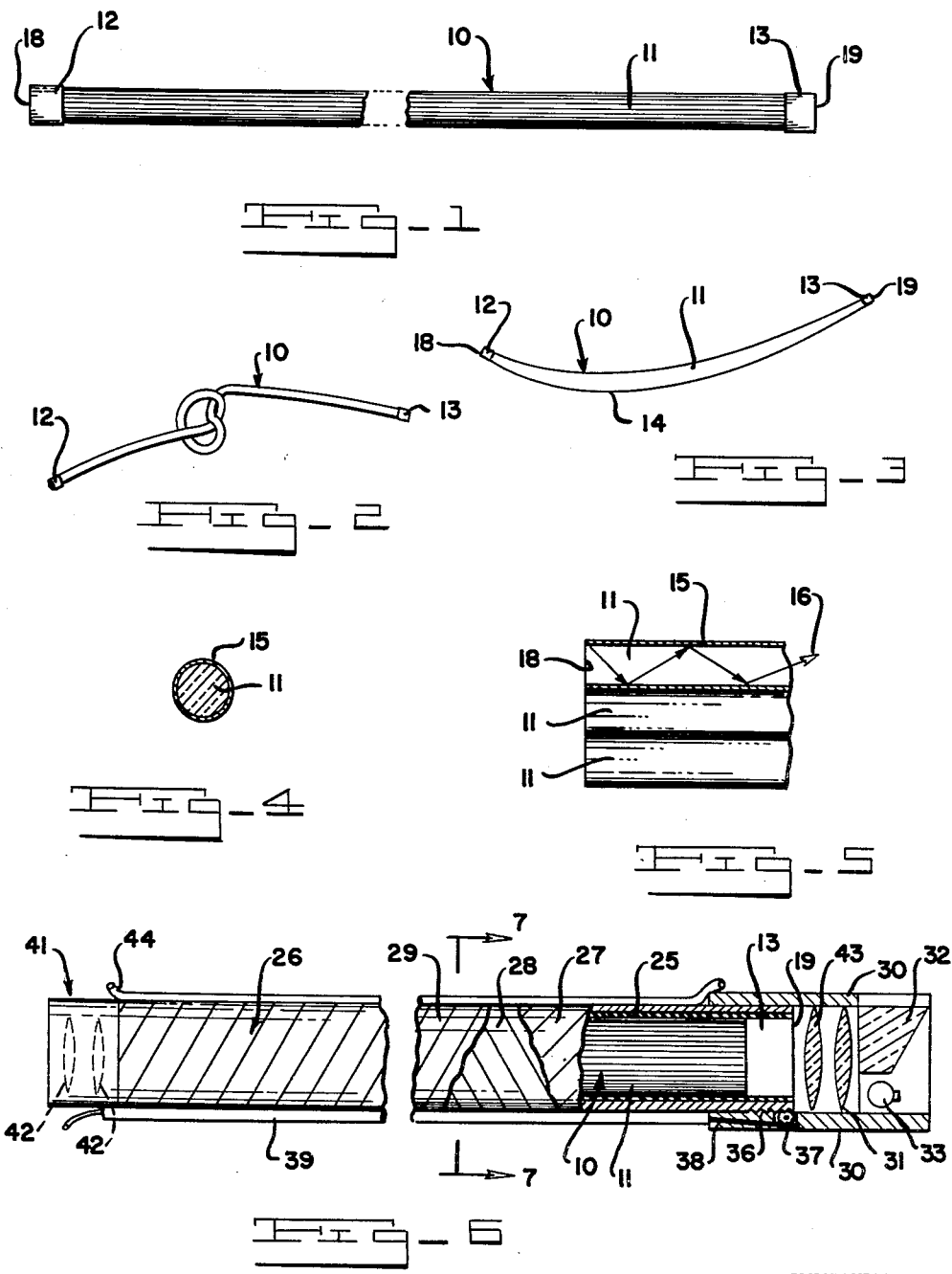
INVENTOR.
BASIL I. HIRSCHOWITZ
BY
Cullen & Cantor
ATTORNEYS

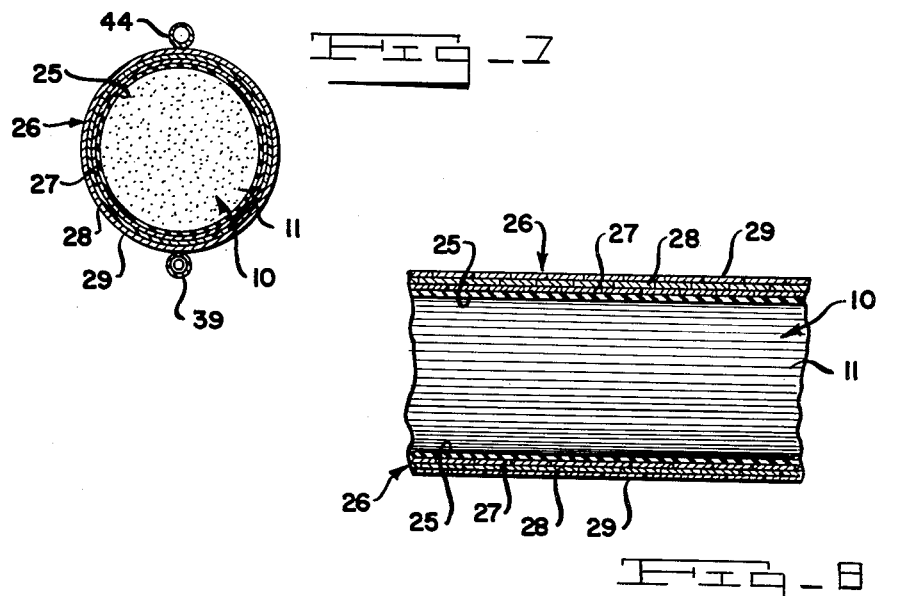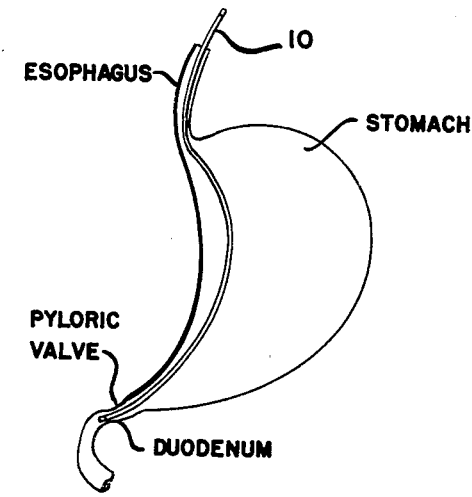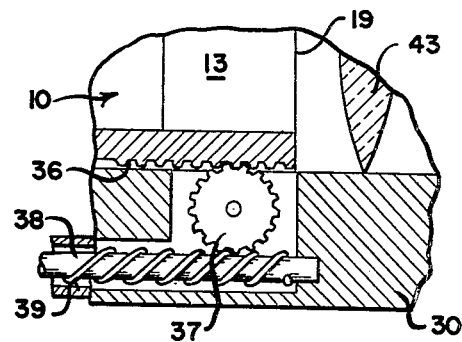

United States Patent Office 3,010,357
Patented Nov. 28, 1961

3,010,357
FLEXIBLE LIGHT TRANSMITTING TUBE
Basil I. Hirschowitz, 300 Nob Hill Place, Ann Arbor, Mich., assignor of thirty-three and one-third percent to C. Wilbur Peters and thirty-three and one-third percent to Lawrence E. Curtiss
Filed Dec. 28, 1956, Ser. No. 631,187
2 Claims. (Cl. 88—1)

This invention relates to a flexible light transmitting tube, and more particularly, to a long, thin, highly flexible, rope-like tube for use in transmitting light and visual images from one end of the tube to the other.

The object of this invention is to provide a long, thin, highly flexible, rope-like tube which will transmit light and visual images from one end to the other even though the tube may be bent around sharp corners and sharp angles and wherein the tube has a high degree of efficiency in the transmission of light over relatively long distances.

Another object is to form a light transmitting tube formed of a bundle of long, extremely thin fibers of a light transmitting material, such as glass fibers, with the fibers being bound together and with each fiber transmitting light and visual images, so that illuminated objects at one end of the tube will be transmitted piece meal by each of the fibers and be visible at the opposite end as a complete image.

A further object of this invention is to form a rope-like light transmitting tube provided with means for efficiently manipulating the tube from one end thereof by twisting and pushing and pulling that one end so that the opposite end of the tube can be maneuvered into position in normally inaccessible places.

Still a further object of this invention is to form a highly flexible, rope-like tube, capable of transmitting light and visual images and particularly designed for insertion into inaccessible places, such as the human stomach and intestines and the like, for visual internal examination of these organs.

Yet another object of this invention is to provide a means for focusing a lens which in turn is attached to one end of the tube whereby the lens may be focused from the opposite end.

These and other objects of this invention will become apparent upon reading the following description of which the attached drawings form a part.

Referring to the drawings, in which:

FIG. 1 is a view of the light transmitting tube, per se.

FIG. 2 illustrates, on a smaller scale, the high degree of flexibility of this rope-like tube and shows the tube tied into a knot.

FIG. 3 is a view on a much smaller scale than FIG. 1 and shows the tube in a bent position with the central flexing thereof being highly exaggerated.

FIG. 4 is a cross-sectional view of one fiber forming the composite tube with the fiber greatly enlarged.

FIG. 5 is a schematic cross-sectional view of a segment of several fibers, to a greatly enlarged scale, and illustrates a ray of light travelling through one fiber.

FIG. 6 is an enlarged view, relative to FIG. 1, partially in cross-section, illustrating a light transmitting instrument formed of the light transmitting tube.

FIG. 7 is a cross-sectional view taken in the direction of arrows 7—7 of FIG. 6.

FIG. 8 is an enlarged view of a section of the tube in cross-section to illustrate the membrane and the three helices surrounding the tube.

FIG. 9 illustrates the use of the tube in examining internal body organs such as the stomach and the duodenum.

FIG. 10 is a further enlarged cross-sectional view of a portion of the instrument shown in FIG. 6.

Light transmitting tube

In FIG. 1, a light transmitting tube made in accordance with this invention is generally designated as 10. This tube is formed of a large number of fibers 11 held against one another to form a bundle. Each of the fibers extends the full length of the tube and they are bound together at their ends 12 and 13 by means of a suitable binding such as a suitable plastic resin, or adhesive, or cement, or the like. Each fiber 11 is highly flexible and is quite thin in cross-section being preferably somewhere in the order of one thousandth to two thousandths of an inch in diameter. Obviously, the thickness may vary considerably but in this case one preferred thickness is given.

The fibers are free of one another between their bound ends 12 and 13 so that the tube 10 is highly flexible; first, because of the inherent flexibility of the thin fibers; and secondly, because of the fact that the fibers may flex and move relative to one another in the center portion of the tube. This is illustrated in FIG. 3 where an exaggerated view shows the center portion 14 as being bowed and widened because of the individual fibers flexing away from one another in the course of bending the tube.

FIG. 2 illustrates the extreme flexibility of the tube by showing the tube bound into a knot. Even here the tube transmits light as well as if it were straightened.

Each of the fibers 11 is formed of light transmitting material such as glass fibers. Alternatively, other light transmitting materials made of plastic may be substituted, but in this case the glass is preferred since better images can be obtained than from the plastic currently available. Each fiber is coated with an outside coating 15 of a resin or clear instrument lacquer of a conventional nature to prevent the loss of light through the sides of the tube. When glass fibers are used, the glass has a high refractive index being somewhere in the order of 1.70 and the coating 15 should be of a low refractive index, as for example approximately 1.5, which thereby prevents the passage of light through the coating but retains the light and transmits the light through the length of the tube. For example, in FIG. 5, a light ray designated as 16 bounces through the fiber 11, which is shown in a greatly enlarged view, and rather than passing through the coating 15 of the low refractive index resin or lacquer, is bounced back through the glass to continue its travel through the length of the glass fiber.

The ends of the bundle are flattened by means of grinding and polishing the ends of the glass fibers so that each flattened end of each fiber is coplanar with the end of every other fiber at the respective ends of the tube.

In operation, light or any illuminated visible image will be picked up and transmitted through one end of the tube and the portions of the light will be carried through each of the tiny fibers 11. Thus, the light is directed through the length of the tube and the light or image is clearly visible at the opposite end of the tube as a composite image which is a replica of what is transmitted into the tube to begin with.

In one embodiment of this invention, a tube of approximately three-eighths of an inch in diameter and being approximately one meter in length was found to be extremely highly efficient in the transmission of light, somewhere over the order of 50% efficiency.

Light transmitting instrument

The light transmitting tube may be used by itself to transmit light from inaccessible places to either a human viewer or to a camera which can record the visual images seen. Obviously, the uses of this tube are unlimited such as for example, to read inaccessibly located instruments or to see inside of normally inaccessible places such as radioactive chambers, etc.

One contemplated use for which this device has been found highly successful, is in the internal examination of human beings. For example, in the diagnosis of peptic ulcers, it has been found that approximately 25% of the ulcers appear on the walls of the main stomach area while approximately 75% of the ulcers appear in the duodenum. There is no present means for internally examining the duodenum and diagnosis must be made from X-rays and by guesses on the part of the examining physicians. The device of this invention is highly flexible and may be inserted through the open mouth of a patient through the stomach and into the duodenum, as illustrated in FIG. 9, and the duodenum may be actually seen by the physician who may immediately diagnose the case without having to take X-rays and go through the remaining steps normally necessary to diagnose ulcers.

An instrument suitable for the purpose of such diagnosis as well as for other purposes in transmitting images, is illustrated in FIGS. 6 to 8. In FIG. 6, the light transmitting tube 10 is shown in an enlarged view larger in size than that shown in FIG. 1.

Here, the tube 10 is completely surrounded, throughout its length, with a thin, highly flexible, air and water impervious membrane 25 which acts as a protection for the fibers.

The membrane 25 may be formed of latex rubber or any other highly flexible material similar to surgical glove rubber and may be in the order of one fourth of a millimeter in thickness. The dimensions here are by no means critical and may be varied depending upon the use for the viewing tube and the maximum thickness of the tube permissible for any particular use.

The outside of the tube is surrounded with a metallic shell 26. The shell is formed of three elongated strips of metal, narrow in width and extremely thin in gauge, one wrapped over the other and each wrapped around the tube in the form of a helix. Each of the helices 27, 28, 29 are wound in a different direction so that each helix crosses over the helix beneath it in a different angle.

The combined thickness of the helices in a practical embodiment may be in the order approximately one millimeter in thickness. The purpose of these helices is to provide a means for manipulating the tube and particularly for manipulating the free end of the tube, which is inserted in an inaccessible spot, from the opposite end which is accessible to the viewer. Each of the helices transmits a torque or load imposed upon it along its direction and thus, three directions are provided with the three helices so that the tube is highly maneuverable by simply twisting and turning and pulling and pushing one end. The load in each case is transmitted to the opposite end. The helices may be wound in such a way that each helix winding abuts the previous winding as illustrated in FIG. 8, or in the alternative it is contemplated that the helices may be interwoven where desired. In each case, however, each helix must be wound around the tube in a different angular direction than the other two helices.

Where the device is used to view inside of a dark area such as inside the human body, a collar 30 in the form of a cylindrical tube surrounds the outside of the distal end portion light transmitting tube 10 and carries a lens 31, a prism 32 and a light source 33. The light source may in the form of an electric bulb which may be connected by a fine wire to the opposite or proximal end of the tube and then to an electric power source. With this type of arrangement, it is desirable to be able to focus the lens 31 by moving the lens towards and away from the end 19 of the light transmitting tube. This is accomplished by providing teeth or serrations on the shell 26 at 36 near the end of the light transmitting tube and engaging a gear 37 with the serrations or teeth which gear is connected with the collar 30 and in turn is engaged by a worm 38. The worm extends through a worm tube 39 fastened on the outside or held on the outside of the light transmitting tube with the worm 38 passing through the tube 39 to the opposite end of the light transmitting tube. The worm may be in the form of a very fine wire having a helical winding of another fine wire with the helical winding functioning as the worm teeth. This construction is illustrated schematically in FIG. 10 which shows the worm 38 with its surrounding helical wire 40 engaging the gear 37 which in turn engages the teeth or serrations 36. With this construction, the collar 30 can be slid forward or backward upon the end of the tube. Other means of adjusting the lens may also be used based upon this general principle of the gear and the adjusting worm.

Where desired for better optical effects an additional lens, such as 43, may be provided in the collar 30.

As mentioned, FIG. 9 illustrates the tube 10 in the form of the instrument shown in FIG. 6 inserted through the esophagus and into the stomach of a human being with the end extending through the pyloric valve and into the duodenum for examining for possible ulcers in the duodenum. With this construction, ulcers are immediately visible in the reflected light of the light source 33 which light shines through the prism 32 and then bounces back through the prism, through the lens 31, through the end 19 of the light transmitting tube and then through the fibers of the tube until the proximal end is reached where it may then be viewed through the eye piece 41 which may contain any sort of viewing lenses 42.

The tube may be manipulated around corners within the stomach by simply twisting the tube end with the twist being transmitted along the helices.

For the purposes of examining a human stomach, the tube may be a meter or more in length and may be somewhere between three-eighths of an inch to one-half inch in diameter. Likewise, an air tube, 44 may be carried by the light tube to permit air to be pumped in to expand the stomach. Regardless of the fact that the tube may be twisted and turned in various directions and bent quite sharply in various places even to the extent of having knots or sharp bends formed within the tube as it is passed into the inaccessible place, the light will be transmitted, with only a very slight loss, from one end of the tube to the other.

This invention may be further developed within the scope of the following attached claims and accordingly, the foregoing description should be read as being merely illustrative of an operative embodiment of my invention and not in a strictly limiting sense.

I claim:

1. An elongated, flexible, optical image transmitting instrument, comprising a plurality of long, thin, flexible, light conducting glass fibers having a predetermined index of refraction, each of said glass fibers having a continuous clear coating formed thereon over the entire surface thereof of a material having an index of refraction which is lower than said predetermined index of refraction, the coating on each of said glass fibers forming a sharply defined continuous interface with the glass fibers over the entire surface thereof, the adjacent end portions of each of the coated glass fibers being bonded together so that said fibers form an elongated bundle with the end portions of the fibers fixed in mutually aligned immovable relation to one another and with the intermediate portions thereof freely movable relative to one another, the end faces of said glass fibers being substantially flat and at the respective ends of said bundle being aligned substantially in a plane extending normal to the longitudinal axis of the adjacent bonded portion of the bundle, a flexible impervious membrane enclosing all but the end portions of said bundle, at least one helically wound flexible metallic member anchored to the opposite ends of said bundle, means for conducting a fluid under pressure along said bundle comprising an elongated, flexible tubular member extending along said bundle from adjacent its proximal end to adjacent the distal end thereof, eyepiece means secured to the proximal end of said bundle, a tubular member mounted on the distal end of said bundle, an objective lens in said tubular member, said objective lens being movable toward and away from the distal end of said bundle, means for focusing an image from said objective lens onto the distal end of said bundle including an elongated flexible member extending along said bundle from adjacent said eyepiece means and operatively connected to said objective lens for selectively shifting the same toward and away from the distal end of said bundle, and illuminating means mounted on said tubular member adjacent to said objective lens for illuminating a field viewed through said bundle and objective lens.

2. An elongated, flexible, optical transmitting instrument as set forth in claim 1 wherein said tubular member has an opening formed in the side wall thereof adjacent to its distal end, said illuminating means being positioned to transmit light through said opening, and a prism mounted intermediate said illuminating means and said openings whereby light from said illuminating means passes through said prism and opening to illuminate the field of view and light reflected from an object in said field passes through said opening and is reflected by said prism through said objective lens to the distal end of said handle.

References Cited in the file of this patent

UNITED STATES PATENTS

| | | |
|---|---|---|
| 177,490 | Fones et al. | May 16, 1876 |
| 887,160 | Webb | May 12, 1908 |
| 1,751,584 | Hansell | Mar. 25, 1930 |
| 1,899,192 | Gaertner | Feb. 28, 1933 |
| 1,950,166 | Durholz | Mar. 6, 1934 |
| 2,185,252 | Kellogg et al. | Jan. 2, 1940 |
| 2,424,064 | Stegeman | July 15, 1947 |
| 2,732,763 | Back et al. | Jan. 31, 1956 |
| 2,825,260 | O'Brien | Mar. 4, 1958 |
| 2,877,368 | Sheldon | Mar. 10, 1959 |

FOREIGN PATENTS

| | | |
|---|---|---|
| 179,905 | Austria | Oct. 25, 1954 |
| 684,492 | Great Britain | Dec. 17, 1952 |

UNITED STATES PATENT OFFICE
CERTIFICATE OF CORRECTION

Patent No. 3,010,357                      November 28, 1961

Basil I. Hirschowitz

It is hereby certified that error appears in the above numbered patent requiring correction and that the said Letters Patent should read as corrected below.

Column 6, line 1, for "openings" read -- openning, --;
same column 6, line 6, for "handle" read -- bundle --.

Signed and sealed this 17th day of April 1962.

(SEAL)
Attest:

ESTON G. JOHNSON                      DAVID L. LADD

Attesting Officer                      Commissioner of Patents